United States Patent [19]

Kobayashi et al.

[11] Patent Number: 4,516,415
[45] Date of Patent: May 14, 1985

[54] STEERING LOCK FOR AUTOMOBILES

[75] Inventors: Satoru Kobayashi; Mikio Masaki, both of Kawaguchi; Hideaki Sakuno, Tokyo; Keiichi Shimizu, Tokyo; Takeshi Fukasawa, Tokyo, all of Japan

[73] Assignee: Kokusan Kinzoku Kogyo Kabushiki Kaisha, Tokyo, Japan

[21] Appl. No.: 403,318

[22] Filed: Jul. 30, 1982

[30] Foreign Application Priority Data

Dec. 26, 1981 [JP] Japan .................. 56-209528

[51] Int. Cl.³ .................. B60R 25/02; F16C 3/00; G05G 5/00
[52] U.S. Cl. .................. 70/252; 70/186; 70/360; 70/DIG. 57
[58] Field of Search .......... 70/252, 360, 186, DIG. 57

[56] References Cited

U.S. PATENT DOCUMENTS

| 1,331,942 | 2/1920 | Ritter | 70/252 X |
| 1,855,697 | 4/1932 | Sullivan | 70/360 X |
| 3,590,611 | 7/1971 | Nakashima | 70/186 |
| 3,747,556 | 7/1973 | Kjellberg | 70/252 X |
| 3,794,796 | 2/1974 | Dwan | 70/252 X |
| 3,940,958 | 3/1976 | Kuroki | 70/186 |
| 4,276,761 | 7/1981 | Eichenauer | 70/360 X |
| 4,285,220 | 8/1981 | Kajita | 70/360 X |

FOREIGN PATENT DOCUMENTS 1081367  8/1967  United Kingdom .................. 70/252

Primary Examiner—Thomas J. Holko
Assistant Examiner—Russell W. Illich
Attorney, Agent, or Firm—Fleit, Jacobson, Cohn & Price

[57] ABSTRACT

A steering lock for an automobile includes a key cylinder, rotatable and axially movable upon rotation of a key inserted in the key cylinder, into locking engagement with a locking bar to lift the latter clear of engagement with a steering shaft. When the key cylinder is turned back and the key is pulled out, the key cylinder is moved back out of locking engagement with the locking bar, which then locks the steering shaft. The returning movement of the key cylinder depresses a spring-loaded control member into a key slot in the key cylinder. When the key cylinder is fully moved back, the spring-loaded control member is pulled out of the key slot. With such an arrangement, the key cylinder can directly engage the locking bar to displace the latter into a retracted position or allow the same to move to a locking position.

3 Claims, 10 Drawing Figures

STEERING LOCK FOR AUTOMOBILES

BACKGROUND OF THE INVENTION

This invention relates to improvements in and relating to steering lock units adapted for use in or on automotive vehicles.

A representative model of the above kind of steering lock unit is provided with a key-operated cylinder lock, the latter being provided in turn with a control member to advance and retract a locking bar into and away from an operating position. The control member is so constructed and arranged as is commonly known so that when the key is withdrawn from a position in the key cylinder, at the unlocking state of the latter, the locking bar is freed from its bound position through check levers and the like motion-transmitting members. When the locking bar is advanced radially of the lock cylinder towards the steering shaft, under the action of the control member, the shaft is locked and vice versa.

However, in this kind of known steering shaft lock unit, the whole mechanism is complicated in its design and structure and not always reliable.

In addition, with conventional steering lock units, antitheft performance is rather poor if an unauthorized person should violently unlock, by use of a wrench or a like tool, from the rear side of the housing or frame, upon detatching the switch box housing, the control switch assembly controlling the electric connections of engine ignition, lighting and various other operations and services within the automotive vehicle.

Another object of the present invention is to provide antitheft security in this respect.

BRIEF DESCRIPTION OF THE DRAWINGS

These and further objects, features and advantages of the invention will become more apparent as a preferred embodiment of the invention is described with reference to the accompanying drawings, in which.

DETAILED DESCRIPTION OF THE INVENTION

Figure 1:
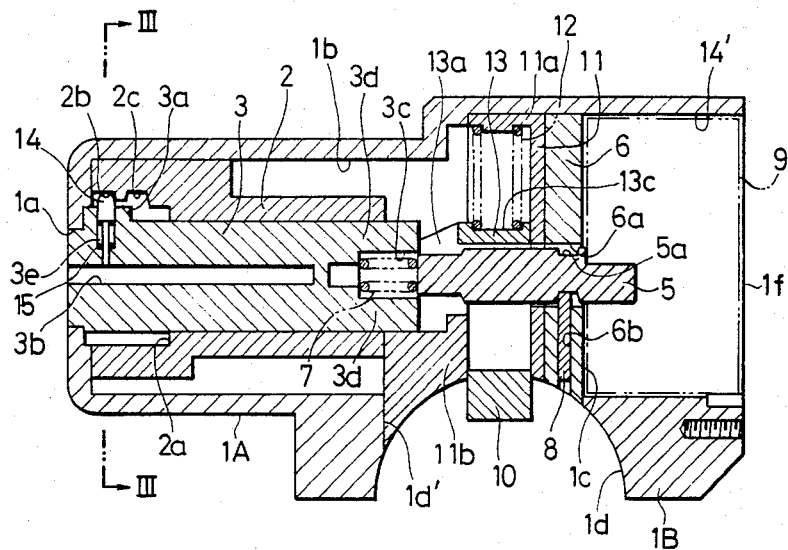
FIG. 1 is an axial section of a preferred embodiment of the inventive steering lock unit shown in its shaft-locking position.

In FIGS. 1–8, a preferred embodiment of the inventive automotive steering shaft locking and unlocking unit ("steering lock"), a hollow unitary housing block ("lock housing") 1 is shown, as comprising a hollow cylindrical element 1A and a hollow subatantially hexagonal element 1B. This composite unitary structure will be most clearly be seen in its outline configuration shown in FIG. 6. The common hollow inside space is shown with a reference symbol 1b and opening at 1a and 1f at the front and rear end, respectively.

Substantially in the front half of the interior space 1b of the lock housing 1, as defined by the hollow cylindrical element 1A, an inside housing case 2 is fixedly mounted, a conventional key cylinder 3 being rotatably mounted therein.

The desired relative unrotational connection between the lock housing 1 and the inside housing case 2 is definitely assured by the provision of three radially and outwardly projecting wings 2A, 2B and 2C defined by the member 2, said wings being snugly received in correspondingly shaped longitudinal grooves 1C, 1D and 1E formed in the inside wall of the said hollow cylindrical element 1A. The front end of the inside housing case 2 abuts snugly against the inside wall surface of the front end of the lock housing.

The key cylinder is formed at a close proximity to the front end thereof with a radial and peripheral projection 3a which is kept in slidable contact with the inside wall surface of the lock housing 1 around the front opening 1a, to prevent the key cylinder from slipping-out from the interior space 1b of the lock housing. The partially peripheral projection 3a is further adapted for establishing a rotatable engagement with an inside stepped wall portion 2a of inside housing case 2, thus avoiding again an axial movement of the key cylinder.

Figure 2:
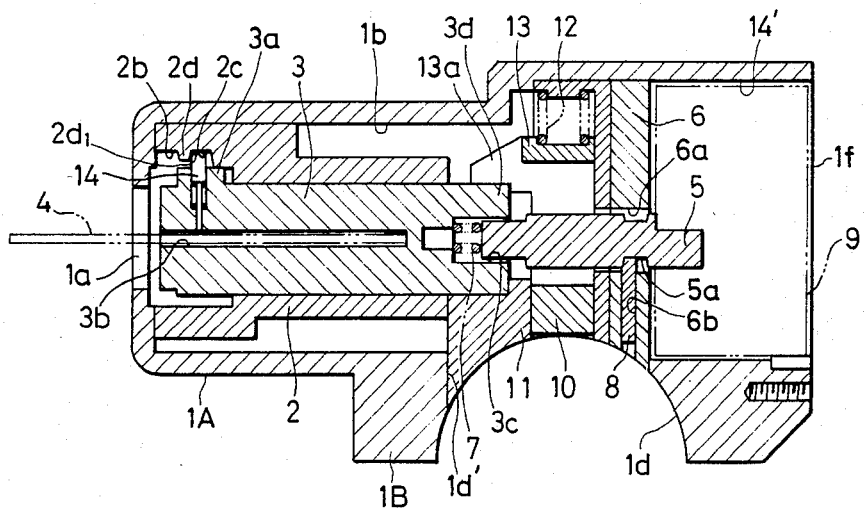
FIG. 2 is a similar view to FIG. 1 shown, however, in its shaft-unlocking position.

Along the longitudinal axis of key cylinder 3, the key cylinder is formed as is conventionally known with a key-insertion slot 3b insertion of a key 4 which is shown only imaginarily in FIG. 2. Naturally, there are provided a certain difinite number of conventional tumbler pins bridging between the key cylinder 3 and inside housing case 2, although not shown on account of its too much popularity and avoid unnecessary complex drawings.

The key cylinder is formed at its rear end with a recess 3c, receiving within its gap the reduced and stepped front end of a first axially extending spindle 5 which passes through an opening 6a bored through a closure plate 6 closing the inside space 1b and separating therefrom a rear idle space 14'.

Figure 6:
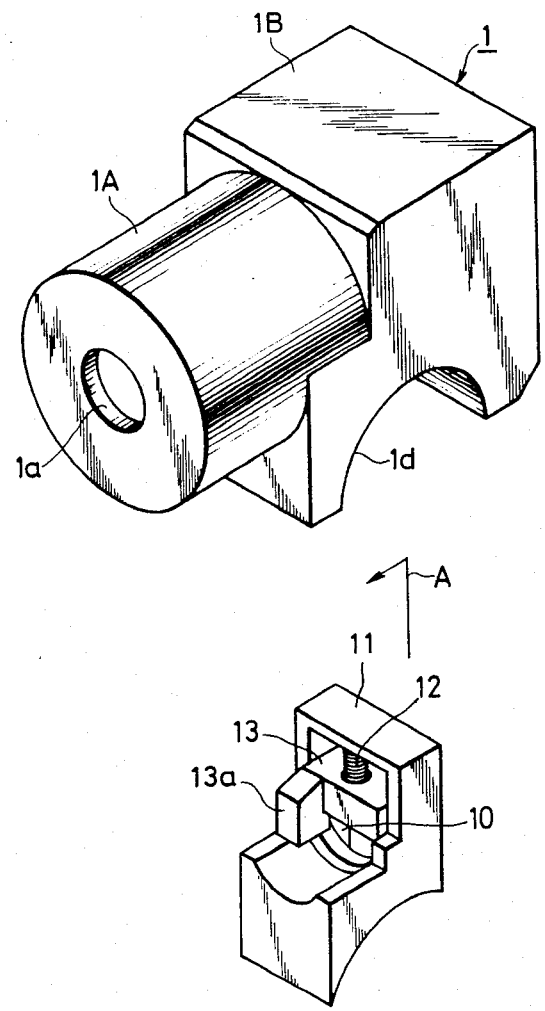
FIG. 6 is an exploded perspective view of a unitary steering unit housing and the said shaft-locking and unlocking mechanism shown in FIG. 5 and, indeed, before insertion of the latter into the former.

As most clearly seen from FIGS. 1, 2, and 6, the hexagonal housing element 1 is formed in its thickened bottom appearing in FIG. 6 with a large lateral semicircular recess 1d communicating with a cross opening 1d'', the latter being kept in communication in turn with the interior housing space 1b. The recess 1d opens towards the automotive steering shaft, although the latter is not shown. The plate 6 is held fixedly in position in the lock housing 1 by abutting against an inside shoulder 1c formed on the inside wall surface 1a thereof. Further, the plate 6 is formed with an elongated opening 6b, extending along nearly half the length thereof and between the bore opening 6a and the arcuated recess 1d. In the elongated opening 6b, there is inserted a second and lateral spindle 8, as seen most clearly from FIGS. 1 and 2. The length of this second spindle 8 is slightly longer than its holding opening 6b and its inner end is kept in engagement with ring recess 5a formed on the first spindle 5, the latter being thus held rotatable in position, yet however, prevented from axial movement, it will be clearly seen that within the recess 3c and between the both members 3 and 5, there is provided a compression spring 7.

In FIGS. 1 and 2 the lower ends of the members 6 and 11 are so prefabricated that a practical extension of the semi-circular curved surface 1d is shown in these sectional drawings.

As for the first member or more specifically, holder 11, will be described more in detail hereinbelow, together with a slide bar 10 acting as the steering shaft locking and unlocking member.

Figure 9:
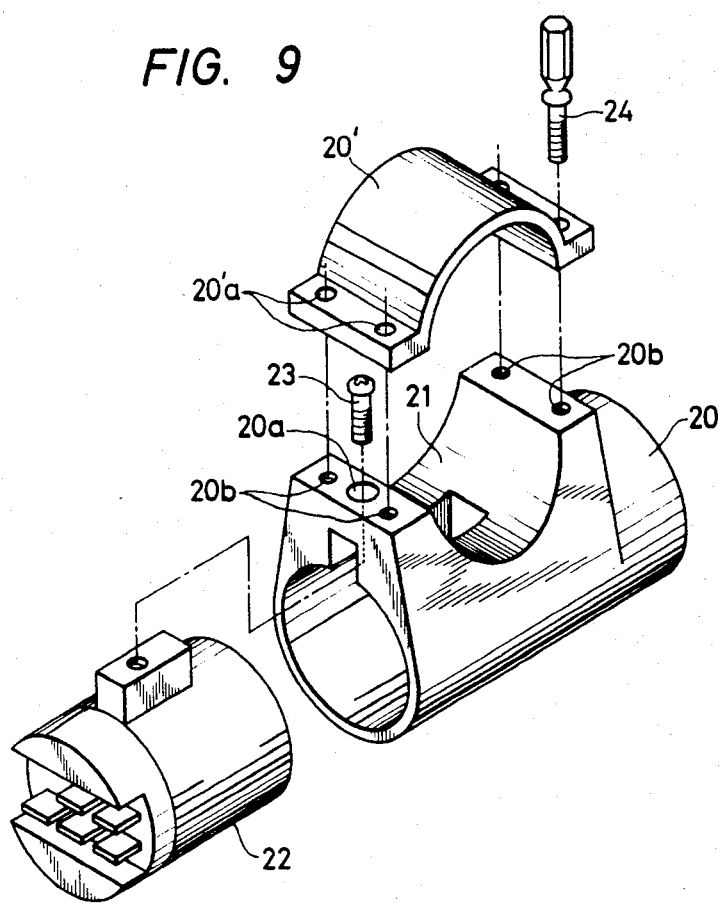
FIG. 9 is an exploded perspective view of a modification of the present invention.
Figure 10:
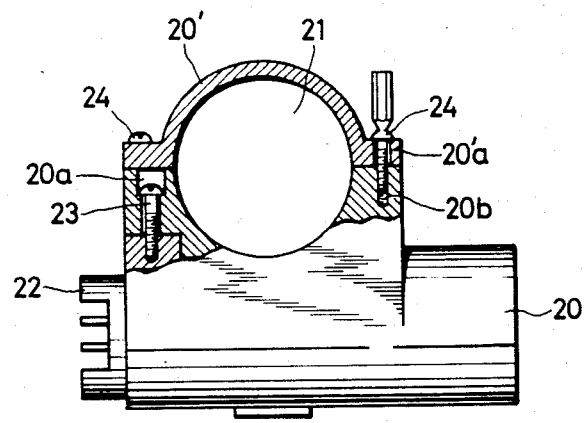
FIG. 10 is a partially sectioned side view of the modification shown in FIG. 9.

Shown in FIGS. 1 and 2 as being fixedly mounted in the rear chamber 1e, a conventional switch case 9 which corresponds to that shown in FIGS. 9 and 10 with numeral 22.

Figure 5:
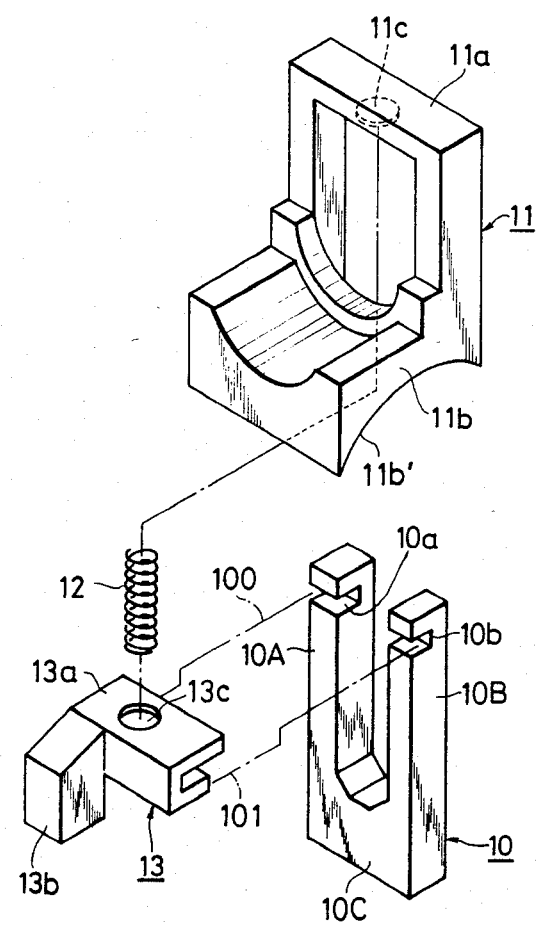
FIG. 5 is an exploded perspective view of a locking and unlocking mechanism employed in this invention.

The numeral 10 represents, more specifically, a kind of locking and unlocking slide bar which is formed with two parallel motion-receiving arms 10A and 10B and an operating front end 10C, as most clearly seen from FIG. 5. This locking bar 10 is movable to-and-fro in the vertical direction when seen in FIGS. 1, 2, 5 and 6 and slidably mounted in a stationary holder 11, the latter being also most clearly seen from FIG. 5.

The holder 11 has generally a chair style configuration (FIG. 5) comprising a top portion 11a and a substantially arc-shaped bottom 11b, the former having an inside recess 11c opening downwards or a downwardly projecting spring seat and the latter having an arc-shaped bottom surface 11b'. On the other hand, numeral 13 represents an intermediate piece comprising a channel-shaped main portion 13a and a motion receiving portion 13b made integral with each other. The member 13 is mechanically coupled with the slide bar 10, as shown by two explanatory and imaginary chain-dotted lines 100 and 101 shown in FIG. 5. The member 13 is formed with an upwardly opening recess 13c. During the assembly of these three members, 10, 11 and 13, so as to provide a steering locking and unlocking mechanism, a coil spring 12 is held under compression between the two opposingly positioned spring-mounting recesses or projections 11c and 13c. In its service position, therefore, the locking slide 10 is urged resiliently towards its locking position.

The locking slide 10 is formed, as shown in FIG. 5, with intermediate, substantially horizontally extending recesses 10a and 10b which are adapted for engagement with the member 13 which is called a check lever, and is to be described later in more detail.

When assemblying the subassembly comprising the foregoing four members 10–13 shown in FIG. 5 in their exploded perspective mode and further shown in their subassembled state in FIG. 6 at the lower half thereof, in advance of introduction of clousure plate 6 into position, through the lateral opening defined between 1c and 1d', and vertically when seen in FIGS. 1, 2 and 6, the subassembly is moved leftwards by a small distance substantially equal to the thickness of closure plate 6, so as to bring the said subassembly into its service position shown in FIGS. 1 and 2. This two-step assemblying procedure is generally suggested by an angular arrow "A" shown in FIG. 6. At this stage, the motion-receiving portion 13b of intermediate member 13 is brought into contact with the actuating end 3d of key cylinder 3.

Then, the closure plate 6 is brought into its service position.

Key cylinder 3 is formed at the front end thereof with key insertion slot 3b and, integrally with the arcuate projection 3a, as was already referred to. A radial and stepped bore 3e is formed through projection 3a as well as the key cylinder wall, the reduced inner portion of the radial bore emerging into the axial slot 3b, as may most clearly be seen from FIG. 3. A movable control member 14, shaped as a headed pin is mounted in the radial bore 3e, the said pin being resiliently urged to move radially outwardly by means of a compression coil spring 15. Thus, the top end of the pin head abuts normally against the inner wall surface of housing case 2, in order to prevent intrusion of the reduced pin end into the key way 3b.

Figure 3:
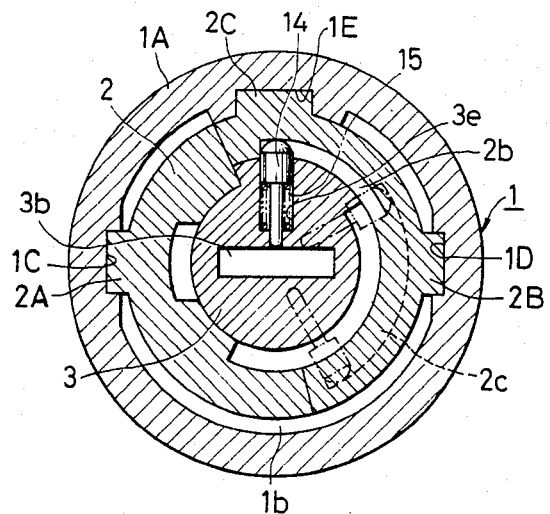
FIG. 3 is a cross-section of the steering lock unit taken along a section line III—III shown in FIG. 1.
Figure 4:
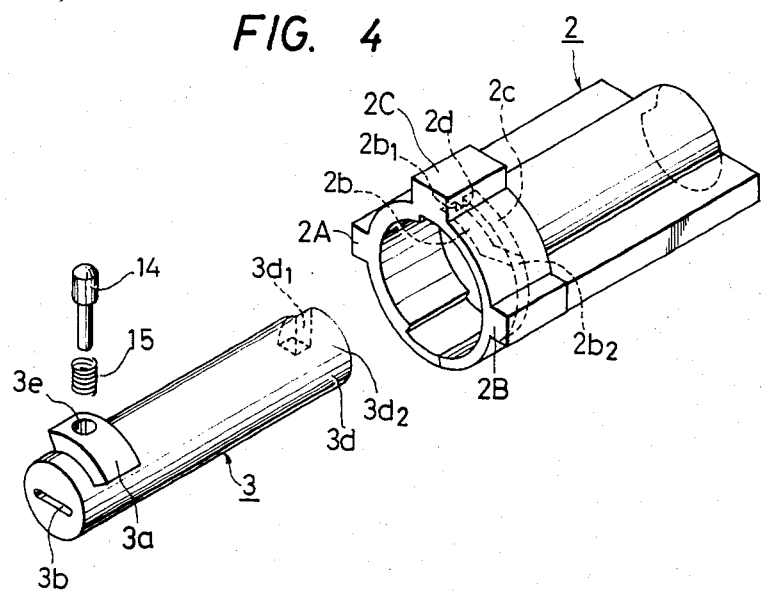
FIG. 4 is an exploded perspective view of the key cylinder and its housing block employed in the said unit.

As seen from FIG. 4, in combination with FIG. 3, it will be seen that an inclined peripheral cam way 2b is formed on the inside wall surface of housing case 2, the beginning shallower end and the terminating deeper end of the cam way being shown at $2b_1$ and $2b_2$, respectively. A further continued peripheral cam way is represented by 2c, which may be used for the both cam-going and cam-returning strokes. The cam way portion exclusively used for the return motion of the cam is denoted with a reference symbol 2c.

The steering lock unit thus contructed will operate as follows:

Before the key 4 is inserted into the key insertion slot 3b, the parts are positioned as shown in FIG. 1. More specifically, the key cylinder 3 is advanced, and the cam follower 13b of the hanger 13 is received in the cam recess $3d_1$ of cam 3d on the key cylinder 3. The hanger 13 is depressed by the spring 12 to force the locking bar 10 into a hole (not shown) in the steering shaft for thereby locking the latter against rotation, as shown in FIGS. 1 and 7(a).

Figure 7:
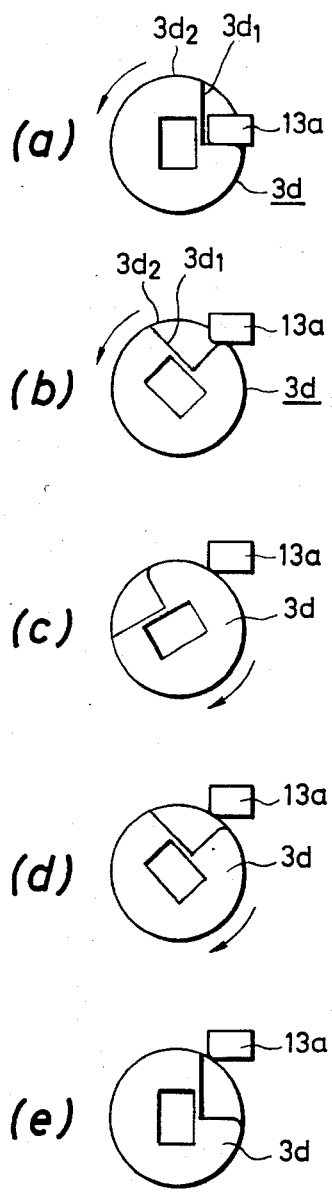
FIG. 7, (a)–(e), show schematically a series of successive cooperational modes between cam means provided at the rear end of the key cylinder and a motion-receiver element composed in the said shaft-locking and unlocking mechanism proper.
Figure 8:
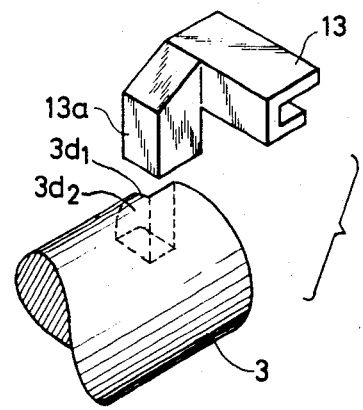
FIG. 8 is an exploded perspective view of the key cylinder and the hanger.

When the key 4 is inserted into the key insertion slot 3b and caused manually to turn the key cylinder 3 a clockwise direction, the key cylinder is pushed into the frame 1 by the control member 14 which moves along the circumferential cam slot 2b. At the same time, the cam 3d on the key cylinder 3 causes the hanger 13 and the locking bar 10 to be retracted out of the locking engagement with the steering shaft, as illustrated in FIGS. 2 and 7(b). When the key cylinder 3 is in an accessory-energizing position, the control member 14 engages the locking step 2c to maintain the locking bar 10 in the retracted position. With continued turning movement of the key cylinder 3 from an ON-position to a START-position (to the position of FIG. 7 (c)) causing the spindle 5 to change electrical contacts in the switch case 9 or 22.

When the key cylinder 3 is turned back to the initial locking position, the control member 14 is positioned on the locking step 2c rearward of the end $2b_1$ of the cam slot 2b with the partition 2d interposed, as shown in FIG. 2, the cam follower 13a being displaced with respect to the cam 3d as shown in FIGS. 7(c) through 7(e). When the key 4 is pulled out of the key insertion slot 3b, the control member 14 is forced to ride over the partition 2d via the tapered guide portion $2d_1$ and then move past the partition 2d into the end $2b_1$ of the cam slot 2b while the key cylinder 3 is advanced under the action of the spring 7 which is stronger then the spring 15. At this time, the control member 14 is depressed into the key insertion slot 3b and then raised out of the slot 3b by the action of spring 15. The cam follower 13a of the hanger 13 is located in alignment with the cam recess $3d_1$ as shown in FIG. 7(e). Therefore, the locking bar 10 is allowed, by the spring 12, to move toward the locking position with the cam follower 13a received in the cam recess $3d_1$ as shown in FIGS. 1 and 7(a) and under the action of the spring 12.

In FIGS. 9 and 10, a cylindrical frame 20 of a steering lock according to a modified embodiment of the present invention houses therein an inside housing, a key cylinder, and a locking bar (not shown), which are of the same contruction as those described herein above. The locking bar is actuable by the key cylinder so as to move into or out of a space 21, in which a steering shaft (not shown) is accommodated. The space 21 is defined between the frame 20 and a fixer frame 20'. The frame 20 contains a switch case 22 in an end portion thereof which is opposite to the end portion in which the inside housing and key cylinder are received. The switch case 22 is fixed in position by a screw 23 threadedly extending through an attachment hole 20a into the switch case 22. With the switch case 22 thus attached, the fixer frame 20 ' is placed over the fastening screw 23 and secured to the frame 20 by fixer bolts 24 threaded through holes 20'a in the fixer frame 20' into threaded holes 20b in the frame 20.

With the present modification, the control member which is responsive to movement of the key cylinder remains out of the key insertion slot when the key is inserted into the key cylinder so that the key can be inserted smoothly without being subjected to undue resistance.

The steering lock of the present modified mode is made of a reduced number of parts and hence is simple in its overall construction.

The steering lock is rendered burglarproof by the holder and the plate which close the large diameter opening in the frame. The steering lock can easily be assembled since the switch case is coupled to the spindle which has been inserted into the key cylinder through the hole in the plate fixedly mounted in the frame.

With the key cylinder securely housed in the frame, the key cylinder cannot be pried or otherwise tampered with at the front end of the frame.

In assembly, the locking bar is first placed in the holder, and the assembly is then inserted into the frame through the opening therein facing the steering shaft. The steering lock can thus be easily assembled. The opening through which parts are introduced is finally closed off by the assembled parts so that the steering lock is rendered burglarproof at the opening.

The spindle which interconnects the key cylinder and the switch case is prevented by the spindle pin from being forced out. The spindle pin is inserted through the opening which faces the steering shaft and which is eventually closed off. Thus, the spindle pin can easily be placed in position and cannot be removed once the steering lock is installed on the steering shaft.

After the steering shaft is mounted on the frame, the switch case cannot be detached and hence is prevented from being tampered with.

Although a certain preferred embodiment together with a modification of the present invention has been shown and described in detail, it should be understood that many changes and modifications may be made therein without departing from the scope of the appended claims.

The embodiments of the invention in which an exclusive property or privilege is claimed are as follows:

1. A steering lock for an automobile, actuated by a key to engage a steering shaft, said steering lock comprising:
   a frame;
   a housing disposed in said frame, said housing defining a cam groove and a locking cam groove;
   a partition defined by the housing separating the cam groove and the locking step cam groove;
   a key cylinder rotatably mounted in said housing for rotation about its axis and for axial movement within said housing, said key cylinder defining a key insertion slot and a radial bore, said key insertion slot extending axially in said key cylinder and said radial bore communicating with said key insertion slot;
   locking rod means movably supported in said frame, said locking rod means being movable between a retracted position wherein the locking rod means is disengaged from the steering shaft and a locking position wherein the locking rod means is located in locking engagement with the steering shaft, said key cylinder including a cam portion engaging said locking rod means;
   a first spring biasing said key cylinder away from said locking rod means;
   a control member slidably mounted in said radial bore and sliding axially along the housing between three positions including a first position where one end of the control member contacts the side surface of said key inserted in the key insertion slot and the other end of the control member engages said locking step cam groove, a second position wherein one end of the control member extends into the key insertion slot and the other end of the control member engages the partition upon the withdrawal of the key from the key insertion slot, and a third position wherein one end of the control member engages said cam groove and the other end of the control member extends to the key insertion slot;
   a second spring biasing said control member radially away from said key insertion slot, the bias of said first spring being greater than the bias of said second spring;
   said key cylinder being axially movable in a first direction by rotation of the key in said key insertion slot to move said control member from said cam groove to said locking step cam groove until said cam portion of the key cylinder moves said locking rod means to said retracted position; and
   said key cylinder being axially movable in a second direction opposite to said first direction by said first spring upon removal of the key from said key insertion slot to move said control member from said first position to said second position and said third position.

2. A steering lock according to claim 1, wherein said cam portion of said key cylinder includes a radially extending cam recess and a peripheral cam portion, said locking rod means including a hangar having a cam follower, said cam follower being movable onto said peripheral cam portion from said radially extending cam recess to displace said locking rod means into said unlocking position upon rotation of said key cylinder, said cam follower being movable from said peripheral cam portion to said cam recess upon the axial movement of said key cylinder in said second direction by the removal of the key from said key insertion slot.

3. A steering lock according to claim 1, including a fixer frame, a space jointly defined by said frame and said fixer frame for accommodating the steering shaft therein, further including a switch case disposed in said frame and operatively connected to said key cylinder, a securing means, an attachment hole defined by said frame, said securing means extending through said attachment hole threadedly into said switch case for securing said switch case to said frame, said fixer frame being placed over said attachment hole with said securing means disposed therein and fixing means for fixing said fixer frame to said frame.

* * * * *